Oct. 23, 1951          J. AGGER          2,572,422
SEAL
Filed Sept. 27, 1946
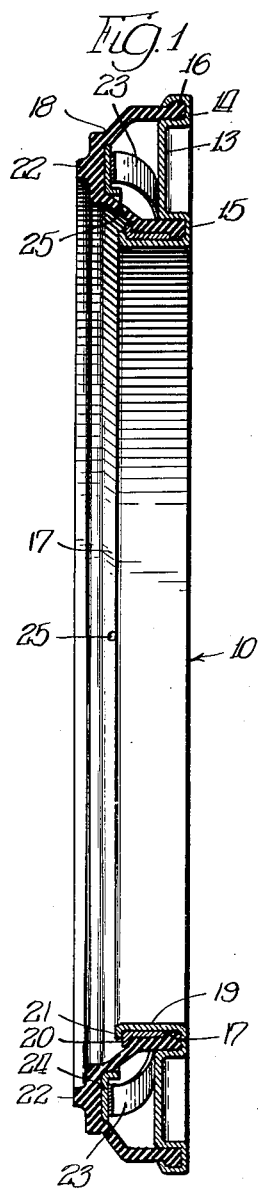
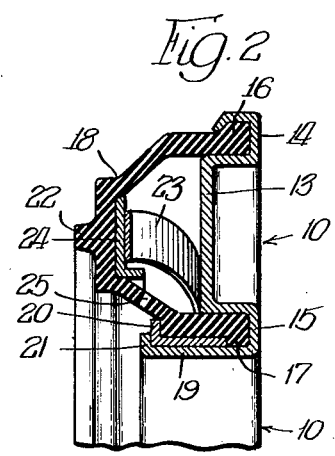
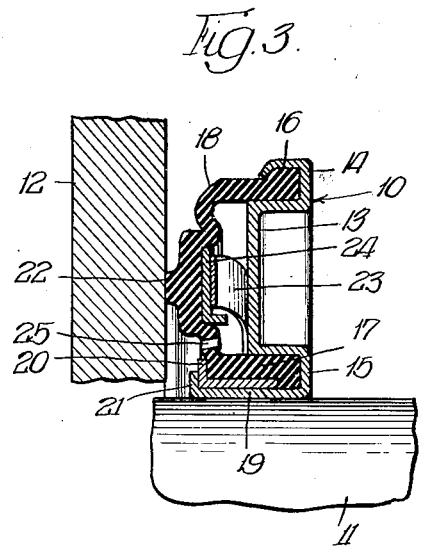
INVENTOR.
Jens Agger,
BY Cromwell, Griest + Warden
Attys Patented Oct. 23, 1951

2,572,422

UNITED STATES PATENT OFFICE 2,572,422

SEAL

Jens Agger, Chicago, Ill., assignor to Chicago Rawhide Manufacturing Company, Chicago, Ill., a corporation of Illinois Application September 27, 1946, Serial No. 699,733

1 Claim. (Cl. 288—3)

This invention relates to improvements in shaft or like seals adapted to prevent loss of liquid, or entry of dirt and foreign matter, between a pair of relatively rotatable parts.

It is an object of the invention to provide a unitary, self-contained diaphragm-type seal of the type described, characterized by a low frictional loss in operation and a ready yieldability in an axial direction to compensate for misalignment of the relatively rotatable parts, or in response to unevenness in the sealing surface of a coacting part.

A more specific object is to provide an entirely self-contained diaphragm-type seal assembly including a conformed diaphragm and resilient means for urging a sealing nose of said diaphragm into operative sealing relation to one of a pair of rotatable parts, in which said resilient means is entirely enclosed and shielded interiorly of the seal assembly.

Yet another specific object is to provide a diaphragm type seal wherein a conformed flexible and resilient diaphragm element is locked at its margins to the respective inner and outer peripheries of a rigid mounting member, so as to constitute an enclosed shield or housing for the spring actuating means of the seal, at the same time sealing against entry of dirt.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claim.

In the drawings,

Fig. 1 is an enlarged view in vertical longitudinal section of a seal in accordance with this invention in relaxed condition thereof, illustrating the entirely self-contained character of the seal;

Fig. 2 is an enlarged fragmentary view, more clearly illustrating details of construction of the coacting diaphragm and mounting member and resilient actuating means of the seal; and Fig. 3 is a view in section similar to Figs. 1 and 2, illustrating the seal in operative installed relation to a pair of relatively rotatable parts, such as a shaft and a housing or the like.

In general, the purpose of this invention is to provide a completely self-contained shaft or like seal of the type referred to above, which is very responsive in its coaction with a relatively rotating sealing surface and will accurately compensate for axial misalignment of a pair of relatively rotatable parts without loss of sealing action at the sealing surfaces. In accomplishing these ends I provide a completely enclosed diaphragm and mounting member wherein an internal actuating spring for the seal is housed and very effectively protected against becoming faultily operative, due to being jammed by foreign matter, or otherwise damaged.

Referring to the drawings, the reference numeral 10 generally designates the seal of the invention which, in an illustrative application of the same, is adapted to be mounted on a shaft 11, as by a force fit, for rotating and sliding engagement with a coacting surface on a housing 12 or like part.

Seal 10 includes a rigid annular mounting ring specially conformed to provide a radially extending web 13 of substantial size, said web terminating at its outer periphery in a rearwardly offset, conformed, re-entrant, forwardly opening channel 14. At its inner periphery the ring also carries a rearwardly offset re-entrant channel 15 which also opens in a forward axial direction. These channels are adapted to receive the opposite, relatively enlarged margins 16, 17 respectively of an annular, cupped diaphragm 18 which is fabricated of a flexible and preferably elastic material such as rubber, synthetic rubber, or the like. Other flexible materials, properly prepared or treated to withstand operating conditions of the seal, may also be employed.

Diaphragm 18 is molded or conformed in a generally U-shaped sectional outline and the outer margins 16, 17 are disposed in channels 14, 15 respectively. Channel 14 is crimped or spun inwardly to fixedly clamp the diaphragm margin 16 therein, without employing other means. Channel 15 is integrally connected with an axially extending, sleeve-like wall 19, at which point the seal is force fitted on the shaft 11; and the margin 17 of the diaphragm is received in said channel 15, being clamped and held therein by a flanged ring 20, in the manner illustrated in Fig. 2. Ring 20 is sustained in place by a radially out-turned annular lip 21 on the axial wall 19.

By the foregoing provisions a completely shielded and protected annular space is provided internally of the diaphragm and radial web 13 of the rigid mounting ring for the reception of the spring actuating means to be described. Outwardly thereof the diaphragm presents an integral, annular, axially extending sealing nose 22 of relatively restricted area.

An annular compression spring 23 of a well known undulatory or wave type is located in the space internally of the seal. This spring abuts web 13 at its rear side and at its forward side bears against a flanged pressure ring 24 which is bonded by vulcanization to the interior of the diaphragm, rearwardly of sealing nose 22. In addition to providing a bearing surface for engagement with, and to distribute the pressure of, the spring on the resilient diaphragm, the pressure ring 24 serves to locate said spring in the radially inward direction and thus retains the same against undesired radial shifting.

The seal is completed by the provision of one or more breather holes 25 through an exposed wall thereof to enable free operation of the seal in compressing and expanding.

When installed, the diaphragm is preferably compressed axially somewhat and in operation functions yieldably in the axial direction, in the manner illustrated in Fig. 3, whereby to compensate for possible irregularities in the bearing surface of the member 12 or variations in axial alignment as pointed out above. The seal is characterized by a very low running pressure and frictional loss and is extremely sensitive in its handling of the variations mentioned above.

Breather holes 25 are of course located on the side of nose 22 opposite the dirt side. In addition to enabling the free operation mentioned, they prevent swelling distortion and possible destruction of the seal due to the building up of high pressure heated air in the seal in operation.

While an integral sealing nose 22 is preferable, it is apparent that other types of sealing element may be secured to the diaphragm by bonding, riveting, etc. Hence, I do not desire to be unduly limited in this regard.

What I claim is:

An end face seal comprising a rigid annular mounting member adapted to be associated with one of a pair of relatively rotatable parts, an annular flexible diaphragm member integrally molded of resilient non-metallic material in a trough-shaped, axially opening cross sectional outline, said diaphragm member terminating in radially spaced inner and outer peripheral margins both of which are secured to said mounting member, said mounting and housing members defining a hollow annular space internally of the seal adapted to be axially compressed in the operation of the seal, and an annular sealing element disposed on the exterior of said diaphragm member forwardly of said internal space, said element being adapted for sealing engagement with the other of said relatively rotatable parts.

JENS AGGER.

REFERENCES CITED

The following references are of record in the file of this patent:

UNITED STATES PATENTS

| Number | Name | Date |
|---|---|---|
| 1,814,908 | Edwin | July 14, 1931 |
| 2,080,669 | Nelson | May 18, 1937 |
| 2,276,622 | Leake | Mar. 17, 1942 |
| 2,328,160 | Marvin | Aug. 31, 1943 |
| 2,486,088 | Yaros | Oct. 25, 1949 |

FOREIGN PATENTS

| Number | Country | Date |
|---|---|---|
| 372,213 | Italy | of 1939 |
| 538,318 | Great Britain | of 1941 |
| 549,337 | Great Britain | of 1942 |
| 564,714 | Great Britain | of 1944 |